May 21, 1935.  J. P. RUTH ET AL  2,001,892
CLUTCH WITH SYNCHRONIZING MEANS
Filed Nov. 7, 1933
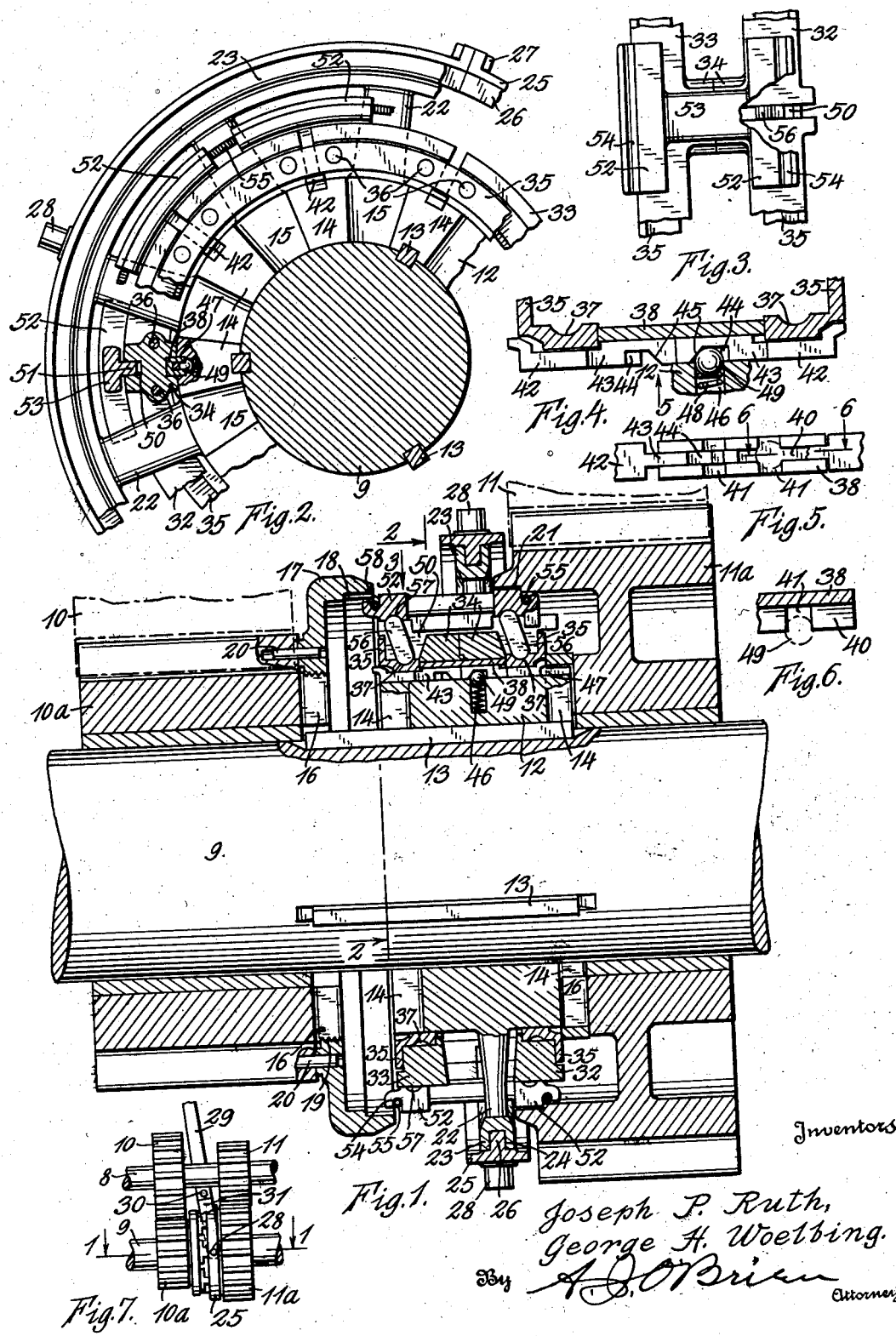
Inventors
Joseph P. Ruth,
George H. Woelbing.
By A. S. O'Brien
Attorney Patented May 21, 1935

2,001,892

UNITED STATES PATENT OFFICE 2,001,892

CLUTCH WITH SYNCHRONIZING MEANS

Joseph P. Ruth and George H. Woelbing, Denver, Colo., assignors to The Ruth Company, Denver, Colo., a corporation of Colorado Application November 7, 1933, Serial No. 696,991

3 Claims. (Cl. 192—53)

This invention relates to improvements in shaft coupling mechanisms and has reference more particularly to a shaft coupling device which is adapted to form part of a transmission gear mechanism of the type interposed between an engine and a drive axle for the purpose of changing the gear ratios.

In many types of machinery it is a great convenience to be able to directly couple a driving shaft to a power transmission member while the shaft is rotating and whenever clutches of the claw type or which employ intermeshing teeth are used, it is impracticable to interconnect the two parts while they are rotating relative to each other, especially where the power transmission member is connected to some machinery that requires considerable force to move it because the sudden interconnection of the driving and the driven members would be resisted by the inertia of the parts of the driven mechanism and the shock due to such sudden interconnection would produce strains that would break the machinery.

In all positively interconnected clutches and in transmission gears, the interconnection must take place either when the parts are standing still or rotating at such relative speeds that the interconnecting teeth will move at the same speed so as to permit them to be brought into mesh without clashing.

In the ordinary transmission gears employed on automobiles, the shifting of the gears for the purpose of varying the gear ratios takes place only after the engine and the car have attained such relative speeds that this shifting can take place without shock.

It has recently become the practice to provide transmission gears with a synchronizing clutch mechanism that will bring the positive drive clutch members into synchronism before the positive drive connection is effected and this simplifies the operation of gear shifting because if the parts are properly constructed and function as intended, the positive drive connection can be made when the relative speed between the driving and the driven parts is sufficient to prevent disastrous results.

It is the object of this invention to produce a clutch of the positive drive type which shall be provided with a synchronizing clutch of such construction that it will move to operative position and function as a friction clutch with sufficient power to produce synchronism of the relatively movable parts before the teeth of the positive drive clutch come into engagement and then release the friction drive so as to allow sufficient relative rotary movement of the parts to permit the clutch teeth to mesh before they can enter into interlocking engagement.

Another object of this invention is to produce a positive drive clutch with synchronizing means that can be employed either in connection with a single power transmission member or in connection with two separate power transmission members, either of which can be independently connected.

Another object of this invention is to produce a clutch of the type described which shall be especially well adapted for heavy duty work, as, for example, in connection with the gear transmissions interposed between an internal combustion engine and the drive wheels of a locomotive.

The above and other objects that may become apparent as this description proceeds are attained by means of a construction and an arrangement of parts that will now be described in detail, and for this purpose, reference will be had to the accompanying drawing in which the preferred embodiment of the invention has been illustrated, and in which:

Fig. 1 is a longitudinal section through the clutch mechanism that forms the subject of this invention;

Fig. 2 is a transverse section taken on line 2—2, Fig. 1, and shows some of the parts in section, while others are shown in elevation, parts having been broken away to simplify the drawing as they are merely duplicates of the parts shown;

Fig. 3 is a view looking in the direction of arrow 3, Fig. 1, and shows the outer surface of one of the friction shoes;

Fig. 4 is a section somewhat similar to that shown in Fig. 1 and shows the latching and unlatching means to a somewhat enlarged scale;

Fig. 5 is a view looking in the direction of arrow 5, Fig. 4;

Fig. 6 is a section taken on line 6—6, Fig. 5; and

Fig. 7 is a side elevation of a gear transmission showing the relative location of the parts.

In the drawing reference numeral 8 designates the drive shaft, while reference numeral 9 designates the driven shaft. The use of two parallel shafts is not essential, but are employed in the particular construction in which the invention is embodied at present, but it is to be understood that the device can be employed for transmitting power between two aligned shaft sections in a manner which will be hereinafter explained.

The drive shaft has secured to it two spur gears 10 and 11, and these gears are so mounted that they have neither rotary nor longitudinal movement on the shaft. Carried by the driven shaft 9 are two spur gears 10a and 11a, which are normally in mesh with gears 10 and 11 respectively. It is evident that if the shaft 8 rotates at a constant speed and power is transmitted from it to shaft 9 through the gears 10 and 10a, the shaft 9 will rotate faster than shaft 8 because the spur gear 10 is larger than the gear 10a, whereas if power is transmitted through gears 11 and 11a shaft 9 will rotate at a slower rate because the gear 11 is smaller than gear 11a and therefore by providing some convenient means for interlocking either of the gears 10a or 11a with the shaft 9, the gear ratio between shafts 8 and 9 can be changed.

Referring now more particularly to Figs. 1 and 2, it will be seen that there has been slidably mounted on the shaft 9, a clutch member 12. This clutch member is held against relative rotation on the shaft by means of three or more keys 13. The ends of the clutch member are provided with teeth 14 between which are the recesses 15 by which the teeth are separated. The gear 10a is provided on the end adjacent to the clutch member with teeth 16 which are properly shaped and positioned to interlock with the teeth 14 in a manner well understood. The gear 10a has secured to the side adjacent the clutch member 12 a ring 17 that has an inner cylindrical surface 18 which will be referred to as a friction surface. This ring may be secured to the gear in any suitable manner, but has been shown as connected to the gear by means of a threaded connection 19 and pins 20. In the particular embodiment illustrated, the power transmission member 11a has been shown as provided with a friction surface 21 that corresponds to friction surface 18 on the power transmission member 10a. The power transmission member 11a is also provided with teeth 16 like those on the other power transmission member and these in turn are designed to intermesh with the corresponding teeth 14 on the clutch member.

The clutch member is provided with outwardly extending radial arms or spokes 22, whose outer ends are joined by a ring 23 that is provided on its outer surface with a groove 24. A collar 25 that has an inwardly extending flange 26 of the proper size to fit the groove 24 is put into place about the ring 23 and the two parts of this collar are held in assembled position by means of bolts 27 as shown most clearly in Fig. 2. Each of the collar parts is provided with a trunnion 28 with which the ends of the shifting fork are connected. The shifting fork has been shown in Fig. 7 where it has been designated by reference numeral 29. This fork is pivoted at 30 and has two arms 31 provided with bearings that cooperate with the trunnions 28 in the manner usual in such constructions.

It is now evident that with the parts which have already been described, it is possible to interconnect the shaft 9 with either one of the power transmission members 10a or 11a by merely shifting the clutch member 12. In Fig. 1 the shaft has been shown as positively connected to the power transmission member 11a and by moving the clutch member 12 towards the left a sufficient distance, it is possible to release the connection between the shaft and transmission member 11a and to establish a similar driving connection between the shaft and the transmission member 10a.

Although a driving connection can be established by the parts already described, it is apparent that it would be impracticable to operate the clutch mechanism while the shaft 9 was turning unless the power transmission member to which connection were to be made was rotating at a speed substantially synchronous with the speed of the shaft and means has theretofore been provided to secure such synchronous rotation before the driving teeth are moved into interlocking engagement.

The synchronizing clutch which will now be described consists of a central ring formed of two sections 32 and 33. These rings are practically identical in construction and are provided with inwardly extending spacing lugs 34 which project through the openings between the spokes 22. The lugs 34 have offset portions like those shown in Fig. 1 that hold them in alignment. On each side of rings 32 and 33 is an angle ring 35. The rings 32, 33 and 35 are held in assembled position by means of rivets 36 that pass through the lugs 34 and through the radial flanges of the angle rings in the manner shown quite clearly in Fig. 2.

The horizontal flanges of rings 35 are provided with circular grooves 37 on their outer surfaces for a purpose which will appear as the description proceeds.

The rings 32 and 33 are held against relative rotation with respect to the clutch member by means of keys 38. For the reception of these keys the spacing lugs 34 are provided with key slots on their inner surfaces as shown in Fig. 2 and the clutch member is provided with corresponding key slots in its outer surface.

In the construction shown there are nine radial arms 22 and nine spacing lugs 34 and there are nine keys 38 employed in the particular construction shown. The keys 38 are each provided on their under side with a longitudinally extending key slot 40 and also with two spaced transverse slots 41. Located in the key slot 40 are two latch releasing members 42. These latch releasing members are provided with portions 43 that fit the slot 40 of the key 38 and these portions are each provided with a notch 44 having one wall inclined as indicated by reference numeral 45. The combined length of the latch releasing members is somewhat greater than the distance between the outer flanges of the angle rings 35 as shown in Fig. 4. The clutch member is provided with a radial opening 46 corresponding to each key 38 and is also provided with a key slot 47 with which the key 38 cooperates. Each of the radial openings has a spring 48 that serves to force a steel ball 49 outwardly against the under surface of the key 38. When the ball is located at the intersection of the slots 40 and 41, it will be in the position shown in Figs. 4 and 5 from which it will be seen that the depth of the notches 44 is equal to the radius of the ball and therefore when it is in the position shown in Fig. 4, the clutch member 12 and the key 38 are positively held against relative movement; but if pressure is applied to the end of member 42 that projects to the left in Fig. 4, the inclined wall 45 will function to move the ball downwardly so as to release the latch. The purpose of this latching device will appear more fully as the description proceeds. The spacing lugs 34 are provided on their outer surface with transverse grooves 50 which are adapted to receive the projecting rib 51 on the inside of each friction shoe 52. One of the friction shoes 52 has been shown in elevation in Fig. 3 from which it will be noted that they are of H-shape. The two parallel parts to which the numerals 52 have been applied in Fig. 3 are the arcuate friction surfaces and these are connected by a transverse portion 53. Each friction shoe is provided near each end with a groove 54 that serves for the reception of tension springs 55 whose function it is to hold them in position against the toggle links 56 by means of which the friction shoes are supported. The inside surfaces of the parts 52 have grooves 57 in which the outer ends of the toggle links 56 rest. Since the toggle links form an unstable support for the friction shoes, it is evident that the action of the springs 55 will bring the shoes inwardly until they seat against the solid surface of the rings 32 and 33 and the toggle links will be inclined in one direction or the other, depending upon the position of the clutch.

Let us now assume that the parts are in the position shown in Fig. 1 and that it is desired to change the gear ratio by bringing the clutch member 12 into driving connection with the power transmission member 10a. When this shift is to be accomplished, the operator exerts a force on the shift lever 29 which moves the clutch member 12 towards the left a sufficient distance to disengage the teeth 14 from the cooperating teeth of the power transmission member 11a. The clutch will now be in neutral position for an instant and as the clutch member moves farther toward the left, the friction surface 52 of each shoe is projected into the flange 17 so as to overlap the friction surface 18 and when the movement has progressed sufficiently for the end surface 58 to strike the shoulder at the inner end of the friction surface 18, the shoe will cease to move, whereas, the rings 32 and 33 on which the toggle links 56 rest will continue their movement with the result that angularity of the toggle links will approach ninety degrees and this will force the surfaces 52 against the friction surface 18 thereby producing sufficient pressure and friction to bring the flange 17 and the power transmission member 10a to which it is connected into synchronism with the shaft. When the toggle links are in vertical position the ends of the teeth 14 and 16 will still be spaced a short distance from each other and will therefore not come into contact until the parts have moved a further distance, whereupon the toggles will incline in the opposite direction from that shown in Fig. 1 and release the pressure, thereby permitting relative movement between the power transmission member and the clutch member, but as this release also decreases the force that must be applied to the shift lever 29, the clutch member 12 will move at increased speed towards the power transmission member, but before the teeth 14 and 16 come into engagement, the end of member 42 will strike the adjacent surface of the flange member 17 and force the ball 49 out of latching position, and thereby permit the clutch member 12 to move freely into interlocking position in which position the ball 49 will be in contact with the other transverse recess 41 in a position corresponding to that shown in Fig. 1, but with the parts engaging the power transmission member 10a instead of power transmission member 11a.

At this point attention is called to the fact that in the operation of this device the synchronizing clutch comprising the friction shoes and the friction surfaces 18 and 21 is first brought into proper operative position, whereupon the friction shoes are stopped by their interengagement with the shoulder at the inner end of the friction surface and this produces relative movement between the clutch member and the friction shoes which movement shifts the angularity of the toggle links and produces the necessary pressure for the friction clutch operation.

It will be observed that when the pressure exerted on the synchronizing clutch is the greatest, the interlocking teeth are still spaced some distance apart and that when further movement is made, the synchronizing clutch is released thereby permitting slight relative rotation between the clutch member and the power transmission member so as to permit the teeth to mesh when they are brought together. The sudden release of the force that had been exerted on the synchronizing clutch permits the parts to move quickly until the adjacent edges of the interlocking teeth are about to interlock when the latching mechanism will be suddenly released, thereby permitting full interlock between the clutch member and the power transmission member.

It is evident that instead of employing the clutch mechanism described for the purpose of making connection between a rotating shaft and a power transmission member rotatably mounted thereon, that the power transmission member can be connected to an aligned shaft section and the device used for connecting aligned shafts while the power shaft is operating.

It is to be understood that the use of this device is not intended to be limited for transmission gears having parallel shafts like that shown in Fig. 7 and that it is adapted for many other uses of which the one illustrated is merely an example.

Having described the invention what is claimed as new is:

1. In a clutch mechanism of the type employed for making a direct and positive driving connection between a shaft and a power transmission member rotatably mounted thereon and which includes a clutch member slidably but nonrotatably mounted on the shaft and means for obtaining synchronous rotation between the shaft and the power transmitting member before the clutch member is operatively connected herewith, the said means comprising an annular flange attached to the power transmission member in concentric relation to the shaft, the flange having a cylindrical friction surface, a plurality of angularly spaced friction shoes carried by the clutch member and mounted for longitudinal movement thereon, means for holding the friction shoes against rotary movement relative to the clutch member, resilient means for urging the friction shoes away from the friction surface, toggles, interposed between the clutch member and each friction shoe, the toggles being normally so inclined that their outer ends are nearer the power transmission member than their inner ends, means for moving the clutch member towards the power transmission member, the adjacent end surfaces of the clutch member and the power transmission member having cooperating teeth adapted to interengage and form a positive driving connection, the friction surfaces of the friction shoes being located in a circle which is normally spaced from the friction surface of the flange whereby the friction surfaces of the shoes and flange can be brought into overlapping position, a stop for limiting the movement of the friction shoes towards the power transmission member, said stop becoming effective before the friction surfaces interengage, the stop being so positioned relative to the interengaging portions of the clutch teeth that the toggle links will be tilted beyond maximum effective position before the clutch teeth come into engagement whereby the synchronizing clutch will be released before the drive clutch becomes effective whereby sufficient relative rotary movement can take place between the clutch member and the power transmission member to permit the teeth to mesh.

2. A clutch of the type employed for making a positive driving connection between two coaxial members mounted for relative rotation about the same axis, comprising, in combination, a shaft, a power transmission member mounted for rotation about the axis of the shaft, a clutch member slidably mounted on the shaft and held against rotation relative thereto, the adjacent portions of the clutch member and the power transmission member having teeth adapted to inerlock and form a positive driving connection, a sleeve mounted for longitudinal movement on the clutch member but held against rotary movement thereon by splines, a latching device for holding the sleeve in a predetermined longitudinal position relative to the clutch member, means for moving the clutch member and sleeve towards and away from the power transmission member, the latter having a circular friction surface, a plurality of friction shoes carried by the sleeve, and mounted for radial and longitudinal movement thereon, each shoe having a friction surface adapted to cooperate with the friction surface on the power transmission member, means for moving the clutch member towards and away from the power transmission member, a stop for limiting the movement of the friction shoes towards the power transmission member, means made effective when the stop functions to force the friction surfaces of the friction shoes against the friction surface of the power transmission member and for releasing the pressure before the teeth on the clutch member and on the power transmission member reach interlocking position, and means operative after the pressure between the friction surfaces has been released for releasng the latching means.

3. A clutch mechanism for interlocking a driven shaft with a driving power transmission member comprising a clutch member slidably but nonrotatably connected with the driven shaft, the adjacent surfaces of the clutch member and the power transmission member having teeth adapted to interlock, a friction clutch mechanism slidably but nonrotatably connected with the clutch member, a positive latching device for holding the clutch member and the friction clutch mechanism against relative longitudinal movement, the friction clutch mechanism and the power transmission member having cooperating friction surfaces, means for moving the clutch means and the friction clutch mechanism towards the power transmission member, means operated by the movement of the clutch member for bringing the friction surfaces into operative position and for forcing them together whereby the driving member and the driven shaft will be forced to rotate at the same speed, means operated by the further movement of the clutch member for releasing the friction clutch, and means operative by the still further movement of the clutch member for releasing the latching device before the teeth are brought into interengaging position.

JOSEPH P. RUTH.
GEORGE H. WOELBING.